Patented Nov. 7, 1944

2,362,408

UNITED STATES PATENT OFFICE 2,362,408

LACTONES OF THE CYCLOPENTANO-POLY-HYDRO-PHENANTHRENE SERIES AND PROCESS OF MAKING SAME

Leopold Ruzicka, Zurich, Switzerland, assignor to Ciba Pharmaceutical Products, Inc., Summit, N. J., a corporation No Drawing. Application May 20, 1942, Serial No. 443,838. In Switzerland June 14, 1941

14 Claims. (Cl. 260—239.5)

The genins of the squill glucosides and of the toad poisons are derivatives of the cyclopentano-polyhydro-phenanthrene series which are characterized by having a simple or double unsaturated δ-lactone group in the side chain. No synthetic process for the manufacture of such substances has previously been known.

Experience has now shown that lactones of the cyclopentano-polyhydro-phenanthrene series can be obtained if functional derivatives of α,β-unsaturated acids of this series, which contain in the γ-position to the substituted carboxyl group at least one methyl or methylene group, are condensed with functional derivatives of formic or oxalic acid, and the products of the reaction subjected to hydrolysis, lactonisation, or reesterification or, in certain cases, decarboxylation.

Finally, the products of the condensation can be subjected at any stage of the process to the action of reducing agents.

Suitable starting materials are esters, nitriles, amides or similar functional derivatives of α,β-unsaturated acids of the cyclopentano-polyhydro-phenanthrene series substituted anywhere in the cyclopentano-p o l y h ydro-phenanthrene radical and containing at least one methyl or methylene group in the γ-position to the substituted carboxyl group.

These starting materials have, for example, the following formulas:

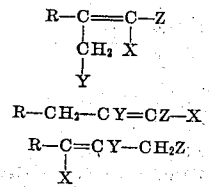

in which R represents a radical containing the cyclopentano-p o l y h y d r o-phenanthrene ring structure, X a functionally transformed carboxyl group and Y and Z hydrogen and/or hydrocarbon radicals e. g. alkyl groups. Carboxylic acid derivatives of $\Delta^{5,6}$; $^{20,22}$-3, 7, 12-t r i a c etoxy-norcholadienic acid, $\Delta^{5,6}$; $^{20,22}$-3-a c e t o x y-21,22-dimethyl-nor-choladienic acid, or $\Delta^{20,21}$-3-acetoxy-21-methyl-bisnor-allo-cholenic acid may be used as initial products. These compounds can be obtained by methods already known, e. g. by introducing a double bond into the corresponding acids, by condensation of 20-keto-pregnane derivatives with α-halogen fatty acid derivatives, or (for the preparation of starting materials of the last mentioned type) by condensation of ketones with hydrogen cyanide and elimination of water, or from pregnane-21-acid derivatives with acetaldehyde and its homologues.

As second components of the reaction, functional derivatives of formic or oxalic acid, e. g. their esters, nitriles or amides, are used.

The condensation is carried out in the presence of condensing agents such as alkaline metals, their alcoholates, amides and similarly acting substances, if necessary in the presence of a solvent or diluent. A mixture may be obtained if the initial compound has more than one reactive methyl or methylene group.

After the condensation, the products of the reaction are present in the form of enol salts or mixtures of enol salts, and must be lactonised by suitable treatment. This can be effected, for example, by the action of lactonising agents, e. g. acid agents, if necessary after hydrolysis of the carboxylic acid derivative grouping. Instead of using hydrolysing and lactonising agents, the lactone can be formed with the aid of reesterifying agents, whereby a total saponification is avoided. If oxalic acid derivatives are used for the condensation, decarboxylating means must generally be used before or after lactonisation.

The double unsaturated lactones obtained in this way may be converted by reducing agents, e. g. by catalytic hydrogenation, into partially reduced still unsaturated or into saturated lactones. This reaction can, however, be carried out at an earlier stage of the process, e. g. before lactonisation.

The following scheme may serve to illustrate the reactions described, without limiting the process in question.

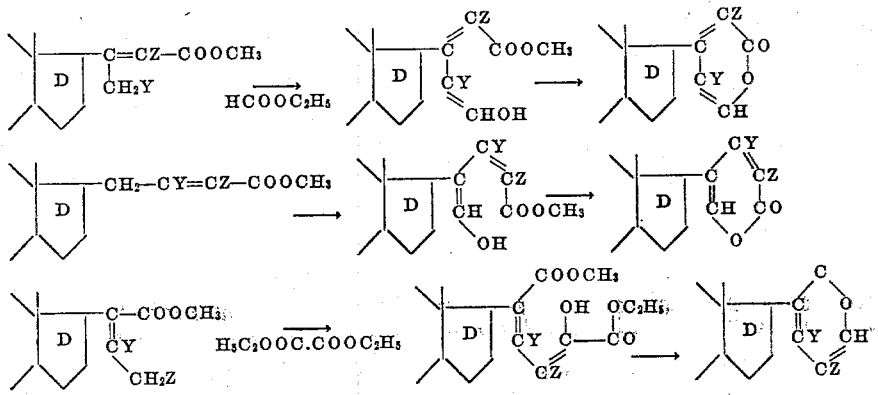

where Y and Z represent the groups previously mentioned.

The products obtained are δ-lactones which are related to the genins of the squill glucosides and the toad poisons, or identical with them, and hence of considerable therapeutic interest.

The following examples illustrate the invention, but are not to be regarded as limiting it in any way.

*Example 1*

5.0 gms. $\Delta^{5,6}$; $^{20,22}$-3-acetoxy-nor-choladienic acid methyl ester and 1.6 gms. ethyl oxalate are dissolved in absolute ether and 1.4 gms. potassium methylate added. The mixture slowly assumes a dark colour. It is allowed to stand for 24 hours and then decomposed with dilute acetic acid. The products of the reaction are dissolved in ether, dried and the ether evaporated off. The residue is treated warm with hydrogen bromide and glacial acetic acid to which some acetic anhydride has been added. The product of the reaction is precipitated by diluting with water, washed with an excess of water and sublimed in a high vacuum, whereby decarboxylation takes place. The sublimate is purified chromatographically by absorption on aluminum oxide. The $\Delta^{5,6}$; $^{20,22}$-3-acetoxy-21-hydroxy- methylene - nor-choladienic acid lactone is obtained.

This may be subsequently partially or completely hydrogenated.

In a similar way Δ-lactones can be obtained by starting from, for example, the α,β-unsaturated acid derivatives named in the description.

*Example 2*

4 gms. $\Delta^{5,6}$; $^{25,26}$-3-acetoxy-26-methyl-cholestadiene-26-carboxylic acid ethyl ester, obtained from norcholestene-3-ol-25-one and bromo-propionic ethyl ester, by Reformatzky's reaction, and subsequent elimination of water, are added to 1 gm. of potassium ethylate prepared in absolute ether. 2 gms. of amyl formate are then added; the mixture allowed to stand for several days shut off from the air and finally decomposed with dilute hydrochloric acid. The product of the reaction is dissolved in ether and washed with ice-cold water. After evaporating off the ether, an amorphous residue is obtained which gives a distinct reaction with ferric chloride. The product is very unstable and should be preferably worked up immediately. For this purpose, it is dissolved in alcoholic hydrochloric acid and warmed for a short time. The solvent is then evaporated off, and the residue acetylated with acetic anhydride. The product of the reaction is distilled in a high vacuum and subsequently purified chromatographically. A mixture is obtained of α'-methyl-β'-[$\Delta^{5,6}$-3-acetoxy-cholenyl-(24)]-pentadienolide, having the formula:

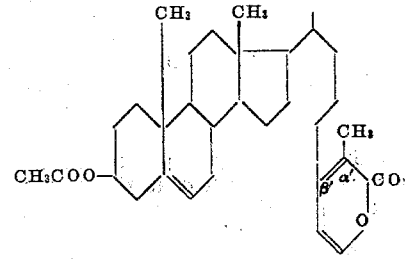

and α',β' - dimethyl -γ'-[$\Delta^{5,6}$-3-acetoxy-nor-cholenyl-(23)]-pentadienolide, having the formula:

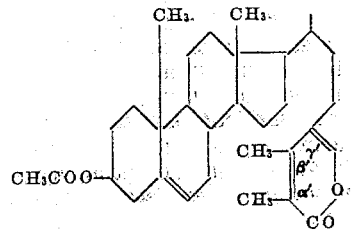

If esters of $\Delta^{5,6}$; $^{21,22}$-3-hydroxy-21-methyl-bis-nor-choladienic acid (obtained from 21-methyl-pregnene-3-ol-20-one and hydrocyanic acid, with subsequent elimination of water and hydrolysis) are treated in the same way, α'-[$\Delta^5$-3-acetoxy-etio-cholenyl-(17)]-pentadienolide is obtained, having the following formula:

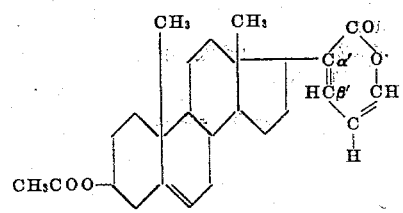

What I claim is:

1. α-Pyrones which are substituted in α'-position by a radical containing the cyclopentano-polyhydro-phenanthrene ring structure, the other carbon atoms of the pyrone ring, insofar as they do not bear oxygen, carrying a member of the group consisting of hydrogen and a hydrocarbon radical.

2. Compounds of the cyclopentano-polyhydrophenanthrene series which are linked at the 17-position with the α'-position of an α-pyrone, the other carbon atoms of the pyrone ring, insofar as they do not bear oxygen, carrying a member of the group consisting of hydrogen and a hydrocarbon radical.

3. Compounds of the formula

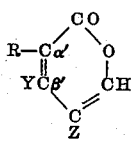

wherein R represents a radical containing the cyclopentano-polyhydrophenanthrene ring structure linked at the 17-position to the lactone ring, and Y and Z each represents a member of the group consisting of hydrogen and a hydrocarbon radical.

4. The α'-[Δ⁵-3-acetoxy-etio - cholenyl -(17)]-pentadienolide of the formula

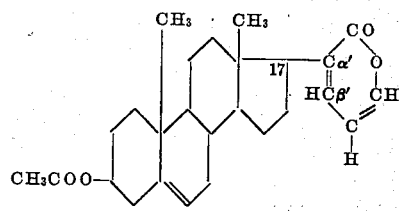

5. A process for the manufacture of a lactone of the cyclopentanopolyhydrophenanthrene series, which comprises condensing a member of the group consisting of the amides, esters and nitriles of the α,β-unsaturated acids of the said series, which contains in γ-position to the amide, ester or nitrile group a member of the class consisting of one methyl group and one methylene group, and wherein the α-, β- and γ-positions contain only carbon and hydrogen atoms, with a member of the group consisting of the amides, esters and nitriles of formic acid and oxalic acid, and treating the resultant product with lactonizing means.

6. A process for the manufacture of a lactone of the cyclopentanopolyhydrophenanthrene series, which comprises condensing a member of the group consisting of the amides, esters and nitriles of the α,β-unsaturated acids of the said series, which contains in γ-position to the amide, ester or nitrile group a member of the class consisting of one methyl group and one methylene group, and wherein the α-, β- and γ-positions contain only carbon and hydrogen atoms, with a member of the group consisting of the amides, esters and nitriles of formic acid and oxalic acid, and treating the resultant product with a lactonizing agent.

7. A process for the manufacture of a lactone of the cyclopentanopolyhydrophenanthrene series, which comprises condensing a member of the group consisting of the amides, esters and nitriles of the α,β-unsaturated acids of the said series, which contains in γ-position to the amide, ester or nitrile group a member of the class consisting of one methyl group and one methylene group, and wherein the α-, β- and γ-positions contain only carbon and hydrogen atoms, with a member of the group consisting of the amides, esters and nitriles of formic acid and oxalic acid, and treating the resultant product with a hydrolyzing agent and then with a lactonizing agent.

8. A process for the manufacture of a lactone of the cyclopentanopolyhydrophenanthrene series, which comprises condensing a member of the group consisting of the amides, esters and nitriles of the α,β-unsaturated acids of the said series, which contains in γ-position to the amide, ester or nitrile group a member of the class consisting of one methyl group and one methylene group, and wherein the α-, β- and γ-positions contain only carbon and hydrogen atoms, with a member of the group consisting of the amides, esters and nitriles of formic acid and oxalic acid, and treating the resultant product successively with a hydrolyzing agent, a lactonizing agent and a re-esterifying agent.

9. A process for the manufacture of a lactone of the cyclopentanopolyhydrophenanthrene series, which comprises condensing a member of the group consisting of the amides, esters and nitriles of the α,β-unsaturated acids of the said series, which contains in γ-position to the amide, ester or nitrile group a member of the class consisting of one methyl group and one methylene group, and wherein the α-, β- and γ-positions contain only carbon and hydrogen atoms, with a member of the group consisting of the amides, esters and nitriles of oxalic acid, and treating the resultant product with lactonizing means and with a decarboxylating agent.

10. A process according to claim 5, wherein there is an additional step of treatment with a hydrogenating agent.

11. A process according to claim 9, wherein there is an additional step of treatment with a hydrogenating agent.

12. A process for the manufacture of a lactone of the cyclopentanopolyhydrophenanthrene series, which comprises condensing a compound of the formula

wherein R represents a radical containing the cyclopentanopolyhydrophenanthrene ring structure, X represents a member selected from the group consisting of the amide and ester groups and the nitrile radical, and Y and Z each represents a member of the group consisting of hydrogen and a hydrocarbon radical, with a member of the group consisting of the amides, esters and nitriles of formic acid and oxalic acid, and treating the resultant product with lactonizing means.

13. A process for the manufacture of a lactone of the cyclopentanopolyhydrophenanthrene series, which comprises condensing a compound of the formula

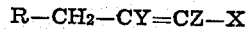

R—CH₂—CY=CZ—X wherein R represents a radical containing the cyclopentanopolyhydrophenanthrene ring structure, X represents a member selected from the group consisting of the amide and ester groups and the nitrile radical, and Y and Z each represents a member of the group consisting of hydrogen and a hydrocarbon radical, with a member of the group consisting of the amides, esters and nitriles of formic acid and oxalic acid, and treating the resultant product with lactonizing means.

14. A process for the manufacture of a lactone of the cyclopentanopolyhydrophenanthrene series, which comprises condensing a compound of the formula

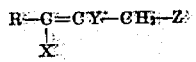

wherein R represents a radical containing the cyclopentanopolyhydrophenanthrene ring structure, X represents a member selected from the group consisting of the amide and ester groups and the nitrile radical, and Y and Z each represents a member of the group consisting of hydrogen and a hydrocarbon radical, with a member of the group consisting of the amides, esters and nitriles of formic acid and oxalic acid; and treating the resultant product with lactonizing means.

LEOPOLD RUZICKA.